US008872932B2

(12) United States Patent
Han

(10) Patent No.: US 8,872,932 B2
(45) Date of Patent: Oct. 28, 2014

(54) APPARATUS AND METHOD FOR REMOVING LENS DISTORTION AND CHROMATIC ABERRATION

(75) Inventor: Ho-suk Han, Osan-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 318 days.

(21) Appl. No.: 12/940,201

(22) Filed: Nov. 5, 2010

(65) Prior Publication Data

US 2011/0115938 A1 May 19, 2011

(30) Foreign Application Priority Data

Nov. 19, 2009 (KR) .................. 10-2009-0112184

(51) Int. Cl.
- H04N 5/228 (2006.01)
- H04N 5/217 (2011.01)
- H04N 9/07 (2006.01)
- H04N 9/04 (2006.01)

(52) U.S. Cl.
CPC ..................................... H04N 9/045 (2013.01)
USPC ......................... 348/222.1; 348/241; 348/267

(58) Field of Classification Search
USPC ................... 348/224.1, 222.1, 167, 241, 247; 382/275
See application file for complete search history.

(56) References Cited

U.S. PATENT DOCUMENTS

| | | | | |
|---|---|---|---|---|
| 7,123,300 | B2* | 10/2006 | Compton | 348/280 |
| 7,289,663 | B2* | 10/2007 | Spaulding et al. | 382/167 |
| 2004/0150732 | A1* | 8/2004 | Yamanaka | 348/272 |
| 2008/0007630 | A1* | 1/2008 | Hara | 348/223.1 |
| 2009/0231472 | A1* | 9/2009 | Kasahara | 348/241 |
| 2009/0238455 | A1* | 9/2009 | Kasahara | 382/167 |
| 2010/0079622 | A1* | 4/2010 | Kasahara et al. | 348/231.99 |
| 2010/0091143 | A1* | 4/2010 | Hara | 348/241 |

OTHER PUBLICATIONS

Kang, "Automatic Removal of Chromatic Aberration from a Single Image," 2007 IEEE Conference on Computer Vision and Pattern Recognition, pp. 1-8 (Jun. 17-Jun. 22, 2007).

* cited by examiner

*Primary Examiner* — Roberto Velez
*Assistant Examiner* — Tuan Le
(74) *Attorney, Agent, or Firm* — Drinker Biddle & Reath LLP

(57) ABSTRACT

An apparatus, computer readable medium, and method of processing an image of a data format having a plurality of color components, the method including generating a plurality of color component images corresponding to the plurality of color components; correcting lens distortion (LD) and chromatic aberration (CA) for each of the plurality of color component images; and generating a corrected image by integrating the corrected plurality of color component images.

19 Claims, 11 Drawing Sheets

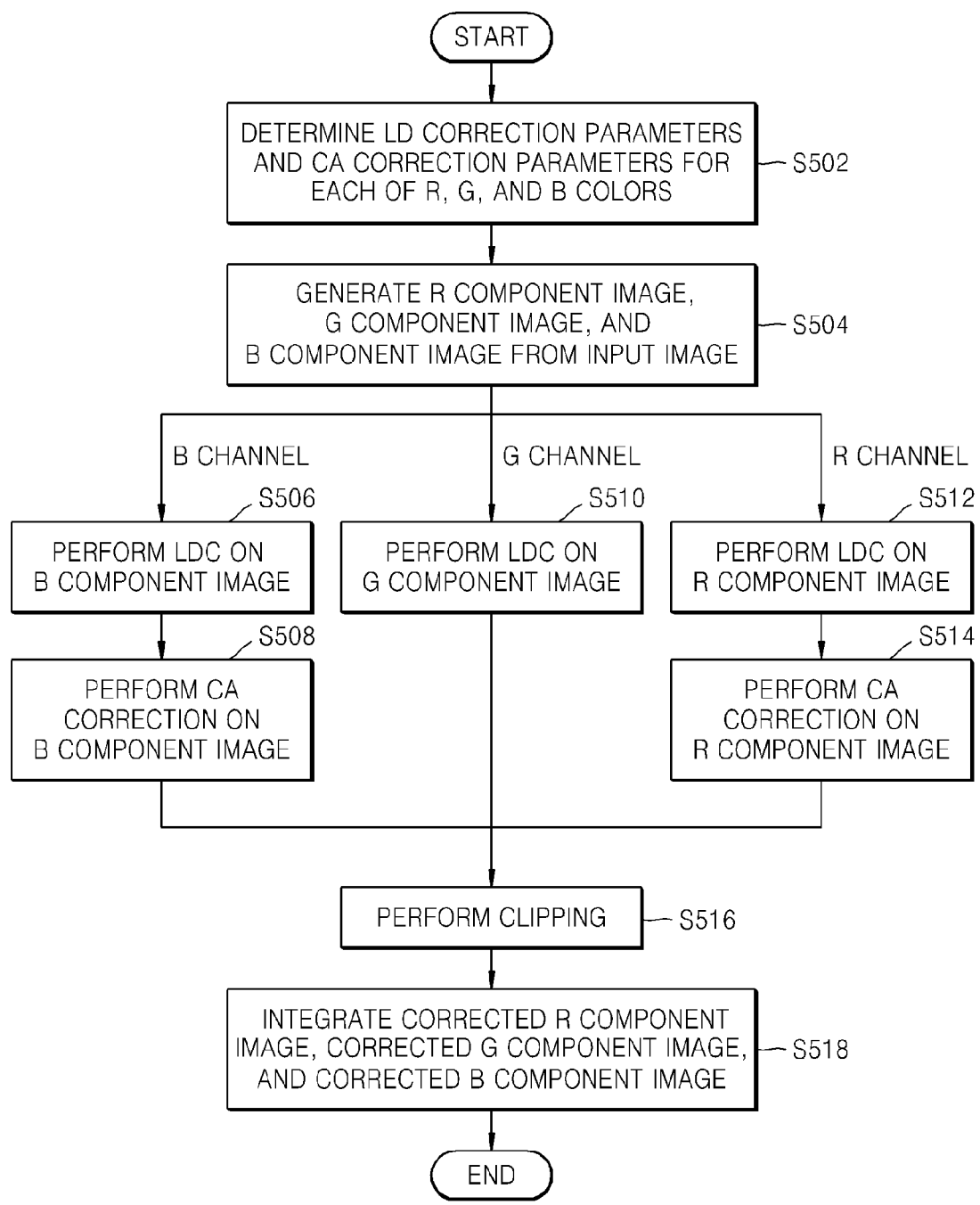

FIG. 6

| LENS TYPE | ZOOM STEP | | R | G | B |
|---|---|---|---|---|---|
| LENS A | ZOOM 1 | LD | $M_1$ | $M_2$ | $M_3$ |
| | | CA | $M_4$ | · | $M_5$ |
| | ZOOM 2 | LD | $M_6$ | $M_7$ | $M_8$ |
| | | CA | $M_9$ | · | $M_{10}$ |
| | ⋮ | ⋮ | ⋮ | ⋮ | ⋮ |
| LENS B | ZOOM 1 | | | | |
| | | CA | | | |
| | ZOOM 2 | | | | |
| | | CA | | | |
| | ⋮ | ⋮ | ⋮ | ⋮ | ⋮ |

FIG. 8

| LENS TYPE | ZOOM STEP | R | G | B |
|---|---|---|---|---|
| LENS A | ZOOM 1 | $N_1$ | $N_2$ | $N_3$ |
| | ZOOM 2 | $N_4$ | $N_5$ | $N_6$ |
| | ⋮ | ⋮ | ⋮ | ⋮ |
| LENS B | ZOOM 1 | | | |
| | ZOOM 2 | | | |
| | ⋮ | ⋮ | ⋮ | ⋮ |

APPARATUS AND METHOD FOR REMOVING LENS DISTORTION AND CHROMATIC ABERRATION

CROSS-REFERENCE TO RELATED PATENT APPLICATION

This application claims the benefit of Korean Patent Application No. 10-2009-0112184, filed on Nov. 19, 2009, in the Korean Intellectual Property Office, the entire disclosure of which is incorporated herein by reference.

BACKGROUND OF THE INVENTION

1. Field of the Invention

Embodiments of the invention relate to an image processing apparatus and method for correcting lens distortion and chromatic aberration, and a computer readable recording medium having recorded thereon a computer program for executing the image processing method.

2. Description of the Related Art

In photographing apparatuses, images are captured by an imaging device converting light incident through a lens into an electrical signal. A position of the lens is adjusted so that the incident light is focused on the imaging device. If the incident light is out of focus, an image captured of a subject is blurred.

While light passing through the lens is refracted, the path of the light is changed, and a focal plane of the light is not flat but curved. Thus, distortion due to the lens occurs on a flat or quasi-flat light-receiving surface of the imaging device. This distortion is referred to as lens distortion (LD).

The incident light includes light beams having all kinds of wavelengths, and the light beams have different refractive indices with respect to the lens according to different wavelengths. In other words, as the wavelength increases, the refractive index decreases. As the wavelength decreases, the refractive index increases. As such, while light beams having different wavelengths are passing through the lens, the light beams travel in different paths according to the different wavelengths and are focused on different points according to the different wavelengths. Accordingly, the captured image may be out of focus and blurred, and this is referred to as chromatic aberration (CA).

SUMMARY OF THE INVENTION

Therefore there is a need in the art for a method of processing an image with a data format comprising a plurality of color components. The method include generating a plurality of color component images corresponding to the plurality of color components; correcting lens distortion (LD) and chromatic aberration (CA) for each of the plurality of color component images; and generating a corrected image by integrating the corrected plurality of color component images.

The data format may be an RGB data format. The plurality of color component images may include an R component image, a G component image, and a B component image.

The correcting of the LD and the CA may include correcting LD and CA of the R component image; correcting LD and CA of the G component image; and correcting LD and CA of the B component image.

Correcting CA may be based on a focal distance of one of the plurality of color components, and in embodiments correcting LD and CA is not performed on the one of the plurality of color components.

The correcting of the LD and the CA may include correcting the LD and the CA of each of the plurality of color component images by using different correction parameters.

The image with the data format may be captured by a photographing apparatus comprising a lens. The method may include determining a plurality of correction parameters for each of the plurality of color components according to at least one of: positions of the lens when the input image is captured, and type of the lens; and wherein correcting may comprise correcting lens distortion (LD) and chromatic aberration (CA) for each of the plurality of color component images by using the plurality of correction parameters.

The plurality of correction parameters for each of the plurality of color components may comprise LD correction parameters and CA correction parameters. The method may include determining the LD correction parameters for each of the plurality of color components according to at least one of: a type of the lens, and a position of the lens; and determining the CA correction parameters for each of the plurality of color components according to at least one of: a type of the lens, and a position of the lens; and correcting lens LD and CA may include correcting LD of each of the plurality of color components by using the LD correction parameters for each of the plurality of color components; and correcting CA of each of the plurality of color components by using the CA correction parameters for each of the plurality of color components.

The method may include before the step of generating equalizing the sizes of corrected color component images on the basis of a corrected color component image having a minimum size from among the plurality of corrected color component images.

An apparatus for processing an image with a data format comprising a plurality of color components is disclosed. The apparatus including an image generation unit configured to generate a plurality of color component images corresponding to the plurality of color components; a correction unit configured to correct lens distortion (LD) and chromatic aberration (CA) of each of the plurality of color component images; and an image integration unit configured to integrate a plurality of corrected color component images corresponding to a result of the LD and CA corrections to generate a corrected image.

The data format may be an RGB data format; the plurality of color component images may be an R component image, a G component image, and a B component image; and the correction unit may include an R correction unit configured to correct LD and CA of the R component image; a G correction unit configured to correct LD and CA of the G component image; and a B correction unit configured to correct LD and CA of the B component image.

The correction unit configured may be configured to perform CA correction based on a focal distance of one of the plurality of color components; and the correction unit may be configured to does not perform substantial CA correction on the one of the plurality of color components.

The correction unit may be configured to correct the LD and the CA of each of the plurality of color component images by using different correction parameters.

The apparatus may include a lens configured to capture the image with the data format; a correction parameter determination unit configured to determine a plurality of correction parameters for each of the plurality of color components according to at least one of: a position of the lens when the input image is captured, and a type of the lens; and wherein the correction unit is configured to correct the LD and the CA of each of the plurality of color component images by using the plurality of correction parameters.

The plurality of correction parameters for each of the plurality of color components comprise LD correction parameters and CA correction parameters; and the correction parameter determination unit further may include an LD correction parameter determination unit configured to determine the LD correction parameters for each of the plurality of color components according to the types of the lens and/or the positions of the lens; and a CA correction parameter determination unit configured to determine the CA correction parameters for each of the plurality of color components according to at least one of: a type of the lens, and a position of the lens; and the correction unit may include an LD correction unit configured to correct LD of each of the plurality of color components by using the LD correction parameters for each of the plurality of color components; and a CA correction unit configured to correct CA of each of the plurality of color components by using the CA correction parameters for each of the plurality of color components.

The apparatus may include a clipping unit configured to equalize the sizes of corrected color component images on the basis of a corrected color component image having a minimum size from among the plurality of corrected color component images, wherein the image integration unit is configured to integrate the plurality of corrected color component images size-equalized in the clipping unit.

A computer readable recording medium is disclosed. The computer readable recoding medium including recorded thereon a computer program for processing an image with a data format comprising a plurality of color components, the computer readable recording medium including a code portion to generate a plurality of color component images corresponding to the plurality of color components; a code portion to correct lens distortion (LD) and chromatic aberration (CA) of each of the plurality of color component images; and a code portion to generate a corrected image by integrating a plurality of corrected color component images corresponding to a result of the LD and CA corrections.

The data format is an RGB data format; and the plurality of color component images comprise an R component image, a G component image, and a B component image; and the code portion to correct the LD and the CA may include a code portion to correct LD and CA of the R component image; a code portion to correct LD and CA of the G component image; and a code portion to correct LD and CA of the B component image.

The code portion to correct LA and CA may include a code portion to correct lens distortion (LD) and chromatic aberration (CA) of each of the plurality of color component images based on a focal distance of one of the plurality of color components; and wherein the CA correction is not performed on on the one of the plurality of color components.

The code portion to correct the LD and the CA may be configured to correct the LD and the CA of each of the plurality of color component images by using different correction parameters.

The image of the data format may be captured by a photographing apparatus comprising a lens; and the computer readable recording medium may further comprise a code portion to determine a plurality of correction parameters for each of the plurality of color components according to at least one of: a position of the lens, and a type of the lens; and the code portion to correct the LD and the CA is configured to correct the LD and the CA of each of the plurality of color component images by using the plurality of correction parameters.

The plurality of correction parameters for each of the plurality of color components may comprise LD correction parameters and CA correction parameters; the computer readable recording medium further may comprise: a code portion to determine the LD correction parameters for each of the plurality of color components according to at least one of: a type of the lens, and a position of the lens; and a code portion to determine the CA correction parameters for each of the plurality of color components according to at least one of: a type of the lens, and a position of the lens; and the code portion for correcting the LD and the CA may comprise: a code portion to correct LD of each of the plurality of color components by using the LD correction parameters for each of the plurality of color components; and a code portion to correct CA of each of the plurality of color components by using the CA correction parameters for each of the plurality of color components.

The computer readable recording medium may include a code portion to equalize the sizes of corrected color component images on the basis of a corrected color component image having a minimum size from among the plurality of corrected color component images.

BRIEF DESCRIPTION OF THE DRAWINGS

The above and other features and advantages of embodiments of the invention will become more apparent by describing in detail exemplary embodiments thereof with reference to the attached drawings in which:

FIG. 5 is a flowchart illustrating an image processing method according to an embodiment of the invention;

FIG. 6 is a look-up table in which LDC parameters and CA correction parameters are stored, according to an embodiment of the invention;

FIG. 8 is a look-up table in which correction parameters are stored, according to another embodiment of the invention;

DETAILED DESCRIPTION OF THE INVENTION

Exemplary embodiments will now be explained with reference to the accompanying drawings. It should be understood however that the disclosed embodiments are merely examples of the invention, which may be embodied in various forms. The following description and drawings are not to be construed as limiting the invention and numerous specific details are described to provide a thorough understanding of the invention, as the basis for the claims and as a basis for teaching one of ordinary skill in the art how to make and/or use the invention. However in certain instances, well-known or conventional details are not described in order not to unnecessarily obscure the invention in detail.

Figure 1:
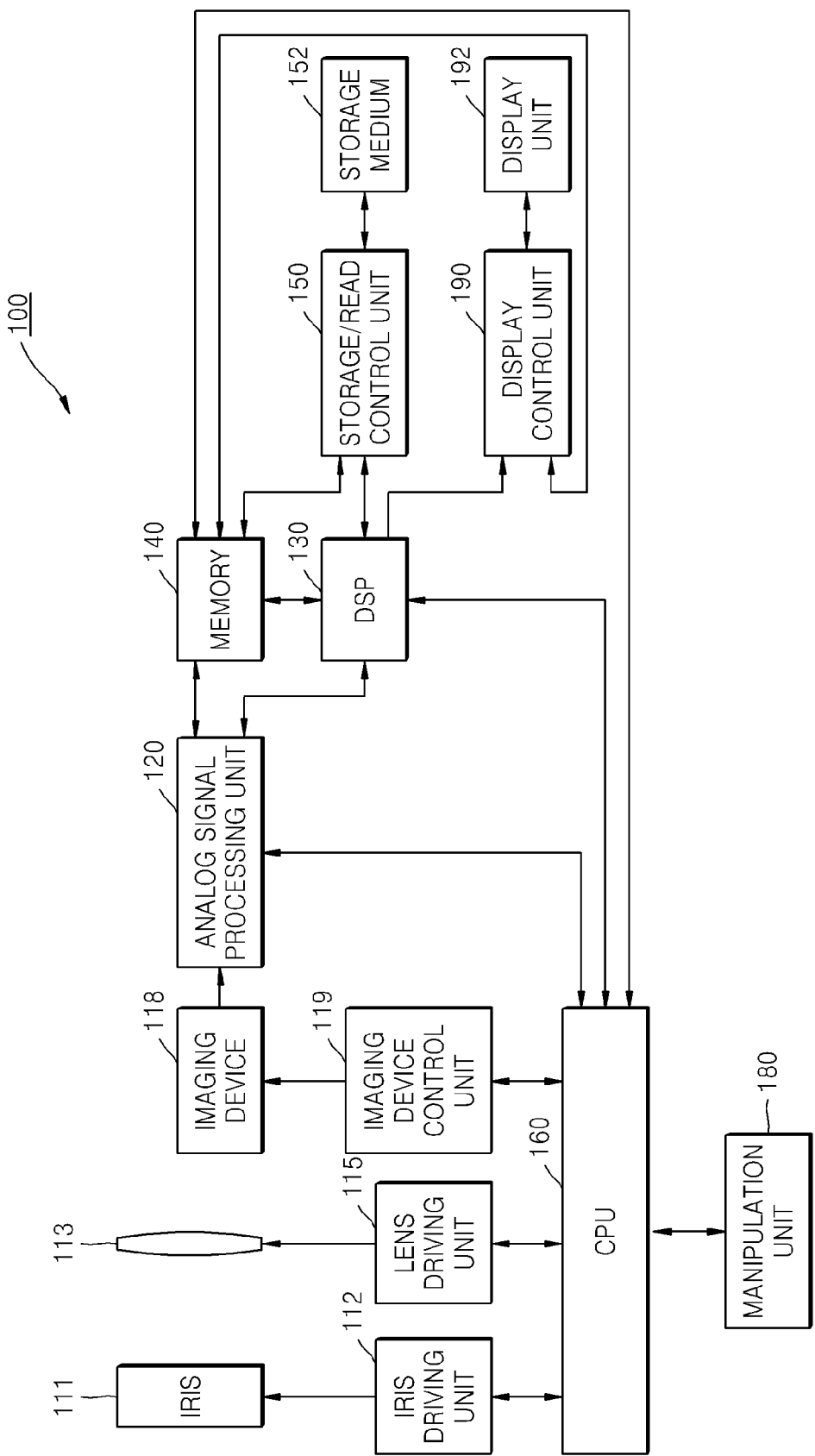
FIG. 1 is a block diagram of an image processing apparatus according to an embodiment of the invention.

FIG. 1 is a block diagram of an image processing apparatus 100 according to an embodiment of the invention.

The image processing apparatus 100 according to the present embodiment may be applied to a digital photographing apparatus having a photographing function. Images input to the image processing apparatus 100 may be images captured by the digital photographing apparatus. FIG. 1 illustrates a schematic structure of the image processing apparatus 100 that is applied to a digital photographing apparatus.

Referring to FIG. 1, the image processing apparatus 100 includes an iris 111, an iris driving unit 112, a lens 113, a lens driving unit 115, an imaging device 118, an imaging device control unit 119, an analog signal processing unit 120, a digital signal processor (DSP)130, a memory 140, a storage/read control unit 150, a storage medium 152, a central processing unit (CPU) 160, a manipulation unit 180, a display control unit 190, and a display unit 192.

The overall operation of the image processing apparatus 100 is controlled by the CPU 160. The CPU 160 provides a control signal for an operation of each component such as the iris driving unit 112, the lens driving unit 115, or the imaging device control unit 119.

The degree to which the iris 111 is open is controlled by the iris driving unit 112, and the iris 111 controls the amount of light incident on the imaging device 118.

The lens 113 may include a plurality of lenses such as a zoom lens, a focus lens, etc. A position of the lens 113 is controlled by the lens driving unit 115. The lens driving unit 115 controls the position of the lens 113 according to a control signal provided by the CPU 160.

An optical signal that passes through the iris 111 and the lens 113 forms an image of a subject on a light receiving surface of the imaging device 118. The imaging device 118 may be a charge-coupled device (CCD) or a complementary metal-oxide semiconductor image sensor (CIS) for converting an optical signal to en electric signal. Sensitivity or the like of the imaging device 118 may be controlled by the imaging device control unit 119. The imaging device control unit 119 may control the imaging device 118 according to a control signal automatically generated by an image signal input in real time or a control signal manually input by a user's manipulation.

An exposure time of the imaging device 118 is controlled by a shutter (not shown). Examples of the shutter may include a mechanical shutter for moving a screen to control the incidence of light, and an electronic shutter for supplying an electrical signal to the imaging device 118 to control the exposure time of the imaging device 118.

The analog signal processing unit 120 performs noise reduction, gain control, waveform shaping, analog-digital conversion (ADC), etc. with respect to an analog signal received from the imaging device 118.

A signal output from the analog signal processing unit 120 may be applied to the DSP 130 via the memory 140 or directly to the DSP 130. If required, the signal may be input to the CPU 160. The memory 140 includes a read only memory (ROM), a random access memory (RAM), or the like. If required, the DSP 130 may perform digital signal processing such as gamma correction, white balance adjustment, and the like.

Image data output from the DSP 130 is transmitted to the display control unit 190 directly or via the memory 140. The display control unit 190 controls the display unit 192 to display images on the display unit 192.

The image data output from the DSP 130 is also input to the storage/read control unit 150 directly or via the memory 140. The storage/read control unit 150 stores the image data in the storage medium 152 automatically or according to a signal from a user. The storage/read controller 150 may also read data about an image from an image file stored in the storage medium 152 and apply the read data to the display control unit 190 via the memory 140 or via another path such that the display unit 192 may display the image. The storage medium 152 may be a detachable component or a built-in component of the digital processing apparatus 100.

The manipulation unit 180 enables the user to input a control signal. The manipulation unit 180 may include a shutter-release button to input a shutter-release signal for exposing the imaging device 118 to light for a predetermined period of time to take a picture, a power button to input a control signal for controlling the image processing apparatus 100 to be turned on or off, a wide-angle zoom button and a telephoto-zoom button to respectively widen and narrow a viewing angle according to a user's input, and various other function buttons such as a button for mode selection from among a character input mode, a photographing mode, a playback mode, etc., a button for selection of a white balance setting function, and a button for selection of an exposure setting function. The manipulation unit 180 may be embodied by any means enabling a user to input a control signal, for example, by buttons, a keyboard, a touch pad, a touchscreen, or a remote controller.

The structure of the image processing apparatus 100 illustrated In FIG. 1 is just an example, and the invention is not limited thereto. In other words, the structure of the image processing apparatus 100 may vary according to embodiments.

Figure 2A:
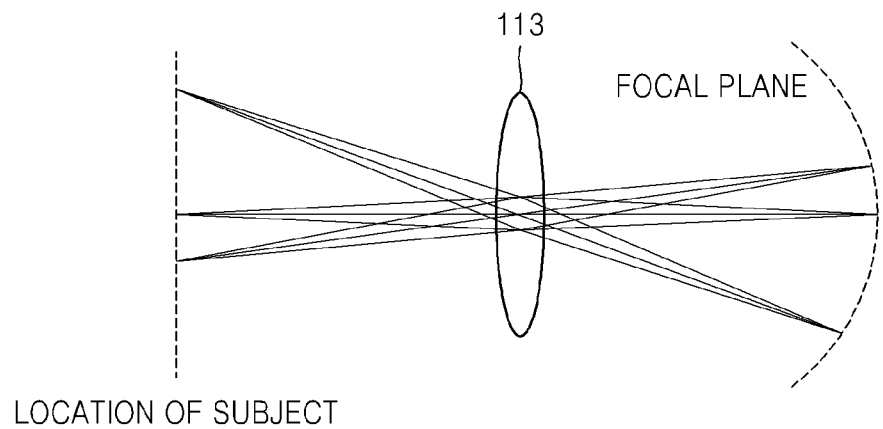
FIGS. 2A and 2B are diagrams illustrating a principle in which lens distortion (LD) is generated.
Figure 2B:
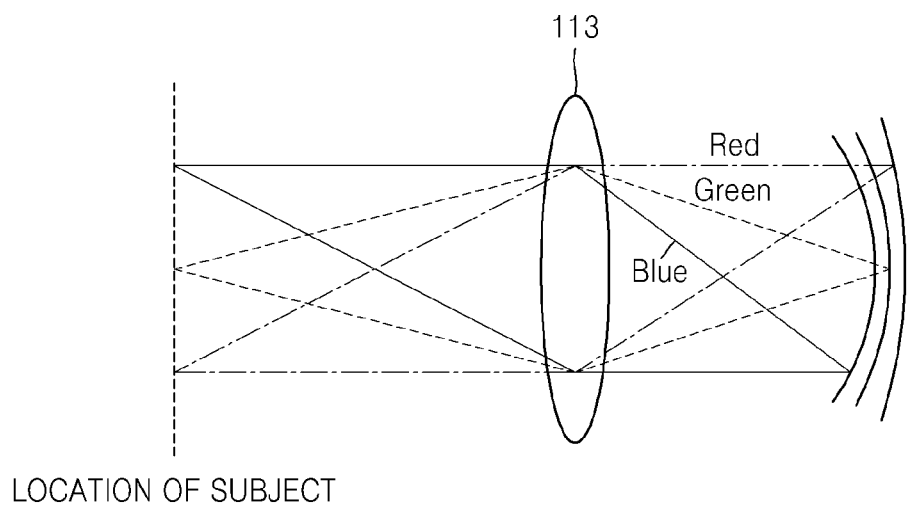

FIGS. 2A and 2B are diagrams illustrating a principle in which lens distortion (LD) is generated.

As illustrated in FIG. 2A, LD denotes a phenomenon in which a captured image is distorted by the lens 113 due to a spherical focal plane generated by incident light that passed through the lens 113. By going from the center of the captured image to the edge thereof, the degree to which the captured image is bent due to the LD increases. LD is more serious in wide-angle or telephoto lenses than in general lenses.

The spherical focal plane as illustrated in FIG. 2A is referred to as a Petzval field surface. However, since the imaging device 118 receiving the optical signal is a flat plane, curvature occurs in the captured image generated by the imaging device 118, and thus LD is generated.

As illustrated in FIG. 2B, different focal planes are generated according to different wavelengths of light. As the wavelength of light decreases, the refractive index of light with respect to the lens 113 is higher, a distance between the focal plane and the lens 113 decreases, and the curvature of the focal plane increases. Accordingly, as illustrated in FIG. 2B, the focal plane of blue-based light having a short wavelength is closer to the lens 113 and has a larger curvature than that of red-based light having a long wavelength.

Figure 3:
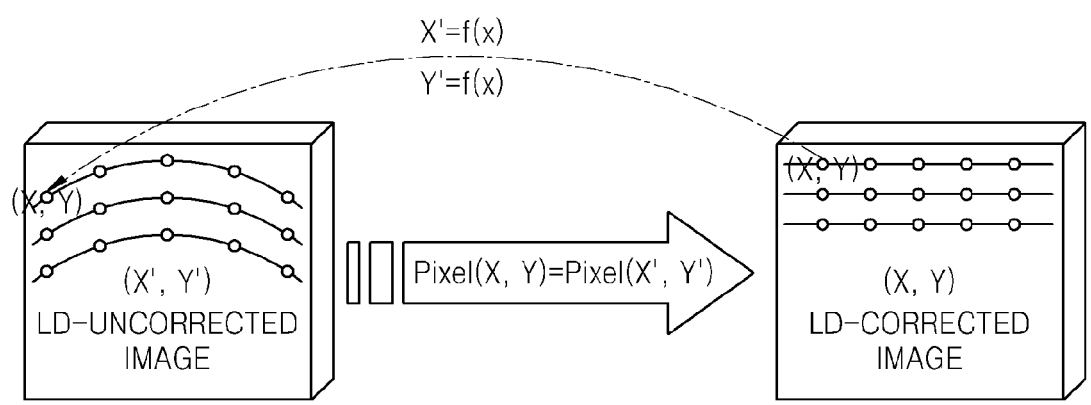
FIG. 3 is a diagram illustrating a principle in which LD is corrected.

FIG. 3 is a diagram illustrating a principle in which LD is corrected.

LD correction (LDC) is for flattening an image curved due to LD. As illustrated in FIG. 3, LD may be corrected by applying a process such as an Affine transform to an image curved due to LD and thus moving each pixel of the image. Assuming that a pixel (X,Y) was moved to a pixel (X',Y') due to LD, a relationship between a pixel on an LD-uncorrected image and a corresponding pixel on an LD-corrected image may be expressed as in Equation 1.

$$\text{Pixel}(X,Y) = \text{Pixel}(X',Y'), \text{ where } X' = f(X) \text{ and } Y' = f(Y) \quad \text{[Equation 1]}$$

To correct LD, a coordinate (X,Y) representing what pixel on the LD-corrected image each pixel (X',Y') on the LD-uncorrected image corresponds to may be obtained using a reversed function of function f. To achieve this, each parameter value of an Affine transform may be obtained, and the Affine transform is applied to coordinates (X',Y') of pixels of the LD-uncorrected image, thereby obtaining the LD-corrected image.

Figure 4A:
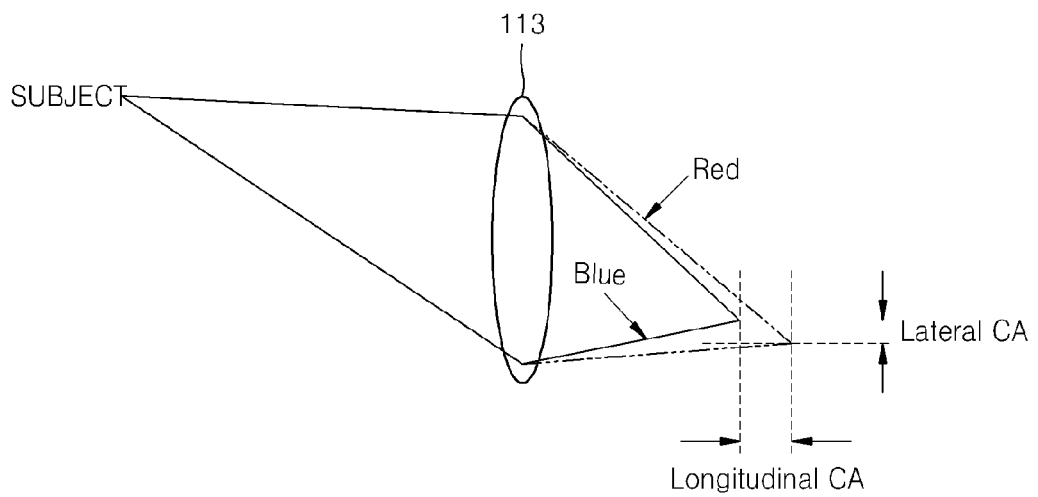
FIG. 4A is a diagram illustrating a principle in which chromatic aberration (CA) is generated.

FIG. 4A is a diagram illustrating a principle in which chromatic aberration (CA) is generated.

CA occurs due to a difference between refractive indices of light according to different wavelengths of light. As illustrated in FIG. 4A, as the wavelength of light increases, the refractive index of light passing through the lens 113 decreases, and thus a focal distance of light increases. On the other hand, as the wavelength of light decreases, the refractive index of light passing through the lens 113 increases, and thus the focal distance of light decreases. This focal distance difference causes CA to occur. In general, CA becomes serious when a contrast between two areas having different colors increases, and when CA occurs, violet color frequently spreads. Examples of the CA include longitudinal CA that occurs as different focal distances are obtained according to different wavelengths, and lateral CA that occurs as images of different sizes are formed on an imaging device according to different wavelengths.

Figure 4B:
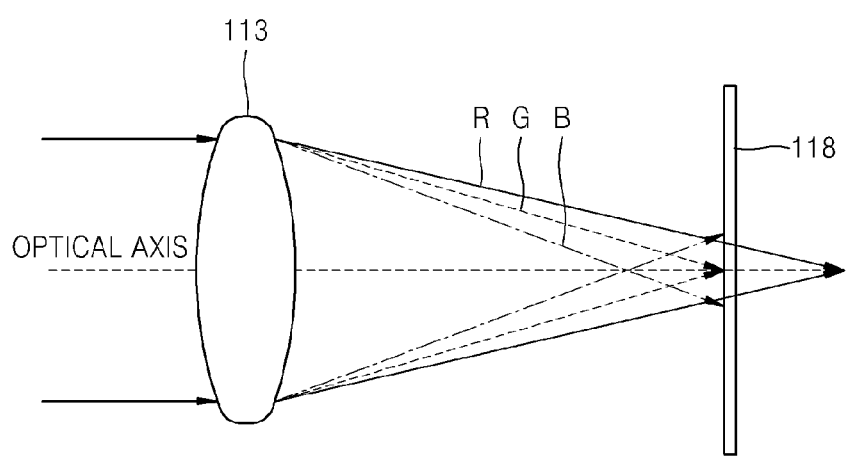
FIG. 4B is a diagram illustrating longitudinal CA.
Figure 4C:
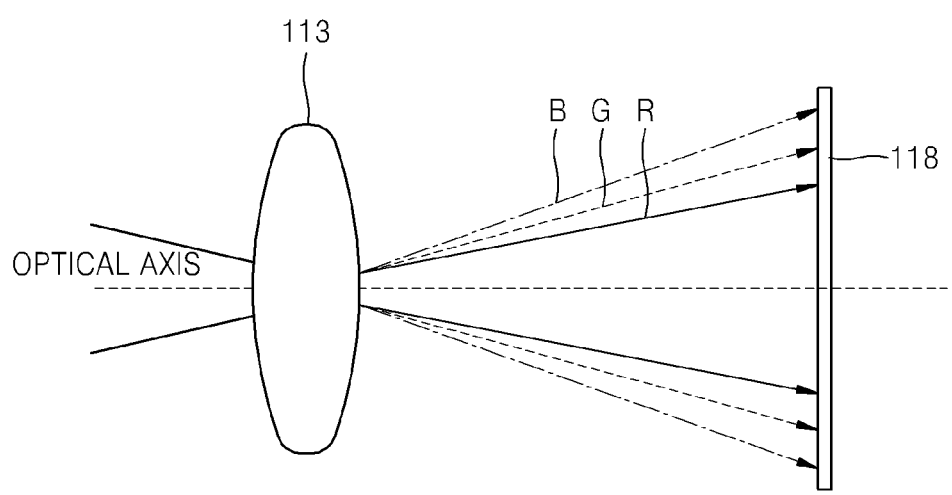
FIG. 4C is a diagram illustrating lateral CA.

FIG. 4B is a diagram illustrating longitudinal CA. FIG. 4C is a diagram illustrating lateral CA.

Longitudinal CA occurs as different focal distances are obtained due to a refractive index difference according to different wavelengths. The refractive index of light decreases as the wavelength of light increases. Thus, red-based light having a long wavelength is focused farther than green-based light, and blue-based light having a short wavelength is focused nearer than the green-based light. As illustrated in FIG. 4B, when the position of the imaging device 118 is determined in accordance with a focal distance of green-based light, blue-based light is focused ahead the imaging device 118, and thus an inverse image is generated on the imaging device 118 or color spreads on the captured image. Also, red-based light is focused behind the imaging device 118, and thus color spreads on the captured image.

Lateral CA denotes a phenomenon in which as different refractive indices are obtained according to different wavelengths, images of different sizes are formed on the imaging device 118. As illustrated in FIG. 4C, as different refractive indices are obtained according to different wavelengths, light beams having respective different wavelengths, which passed through the lens 113, travel in different paths. When the light beams having respective different wavelengths have reached the imaging device 118, magnifications of a subject formed as images are different, and thus the captured image corresponding to the subject is blurred.

LD and CA may be basically corrected using an additional correction lens. However, the use of the additional correction lens increases the price of image processing apparatuses and the thickness of the lens 113, leading to large image processing apparatuses.

FIG. 5 is a flowchart illustrating an image processing method according to an embodiment of the invention.

In embodiments of the invention, LDC and CA correction are independently performed on each of a plurality of color components of a data-format image. An embodiment of processing an input image having an RGB data format will now be described; however the invention is not limited thereto.

In the image processing method according to the present embodiment, in operation S502, LDC parameters and CA correction parameters for each of R, G, and B are determined. In other words, LDC parameters and CA correction parameters for R, LDC parameters and CA correction parameters for G, and LDC parameters and CA correction parameters for B are determined. The LDC parameters and CA correction parameters may be previously stored in the form of a look-up table. According to an embodiment of the invention, the LDC parameters and CA correction parameters for each of R, G, and B may be determined according to types and zoom steps of lenses. The LDC parameters and CA correction parameters for each of R, G, and B may be determined according to types and zoom steps of lenses by using pre-stored information, for example, by using a look-up table.

FIG. 6 is a look-up table in which LDC parameters and CA correction parameters are stored, according to an embodiment of the invention. In FIG. 6, LD denotes an LDC parameter, and CA denotes a CA correction parameter. As illustrated in FIG. 6, the LDC parameters and the CA correction parameters may be previously stored for each of R, G, and B. The look-up table may be previously stored in, for example, the storage medium 152 or the memory 140. The LDC parameters and CA correction parameters for each of R, G, and B may vary according to the types and zoom steps of lenses. Accordingly, the look-up table may include the LDC parameters and CA correction parameters for each of R, G, and B and also for the types and zoom steps of lenses. Each LDC parameter and CA correction parameter may be stored in the form of, for example, a matrix.

Referring back to FIG. 5, in operation S504, an R component image, a G component image, and a B component image are generated from an input image. In embodiments of the invention, LDC and CA correction are independently performed on each of the plurality of color components of the input image, and thus the input image is divided according to color components. The input image may be a Bayer pattern image, or a data-format image including a plurality of color components, for example, a RGB data format image.

Although operation S504 is performed after operation S502 in FIG. 5, the order in which operations S502 and S504 are performed may be arbitrarily determined, or operations S502 and S504 may be performed simultaneously.

When the LDC parameters and CA correction parameters for each of R, G, and B are determined in S502 and the R component image, the G component image, and the B component image are generated from the input image in operation S504, LDC and CA correction are performed on each of the R component image, the G component image, and the B component image. In other words, LDC is performed on the B component image by using the LDC parameters for B in operation S506, and CA correction is performed on the B component image by using the CA correction parameters for B in operation S508. In operation S510, LDC is performed on the G component image by using the LDC parameters for G. LDC is performed on the R component image by using the LDC parameters for R in operation S512, and CA correction is performed on the R component image by using the CA correction parameters for R in operation S514.

According to an embodiment of the invention, CA correction may not be performed on a color component having a focal distance on which determination of the position of the imaging device 118 is based from among a plurality of color components of an input image. For example, if the position of the imaging device 118 is determined according to a focal distance of a green-based optical signal, a G component image may be subjected to only the LDC operation S510 and may not be subjected to CA correction.

LDC may be performed by shifting pixels using a relationship indicated in Equation 2.

$$X'=F(X)=Sx(1+K1*R+K2*R*R)*(X-Cx)+Cx$$

$$Y'=F(Y)=Sy(1+K1*R+K2*R*R)*(Y-Cy)+Cy \quad \text{[Equation 2]}$$

where Sx, Sy, K1, and K2 denote scaling LDC parameters, and Cx and Cy denote LDC parameters that represent the center of an optical axis. R may be expressed as $(X-Cx)^2+(Y-Cy)^2$, and indicates how far a corresponding pixel is from the optical axis.

CA correction may be performed by shifting pixels using a relationship indicated in Equation 3.

$$X'=F(X)=S1(X-Scx)+S2+Scx$$

$$Y'=F(Y)=S3(Y-Scy)+S4+Scy \quad \text{[Equation 3]}$$

where S1 and S3 denote scaling CA correction parameters, S2 and S4 denote shift CA correction parameters, and Scx and Scy denote CA correction parameters that represent the location of the optical axis.

Referring back to FIG. 5, when the LDC and the CA correction are completed, clipping is performed to adjust the sizes of a corrected R component image, a corrected G component image, and a corrected B component image that correspond to results of the LDC and CA correction performed with respect to the R component image, the G component image, and the B component image, respectively, in operation S516. Since the CA correction includes a resizing operation of enlarging or reducing each of the R, G, and B component images, the corrected R component image, the corrected G component image, and the corrected B component image include invalid pixels, and thus the invalid pixels are clipped through clipping. Thus, an R component image, a G component image, and a B component image that include only valid pixels and have the same size are obtained. The clipping may be performed so that images having sizes other than the smallest size of an image are clipped, for example, so that images having sizes other than the size of the B component image are clipped. Thereafter, in operation S518, the corrected R component image, the corrected G component image, and the corrected B component image subjected to the clipping are integrated to output a corrected image. The corrected image may be, for example, a Bayer pattern image.

Figure 7:
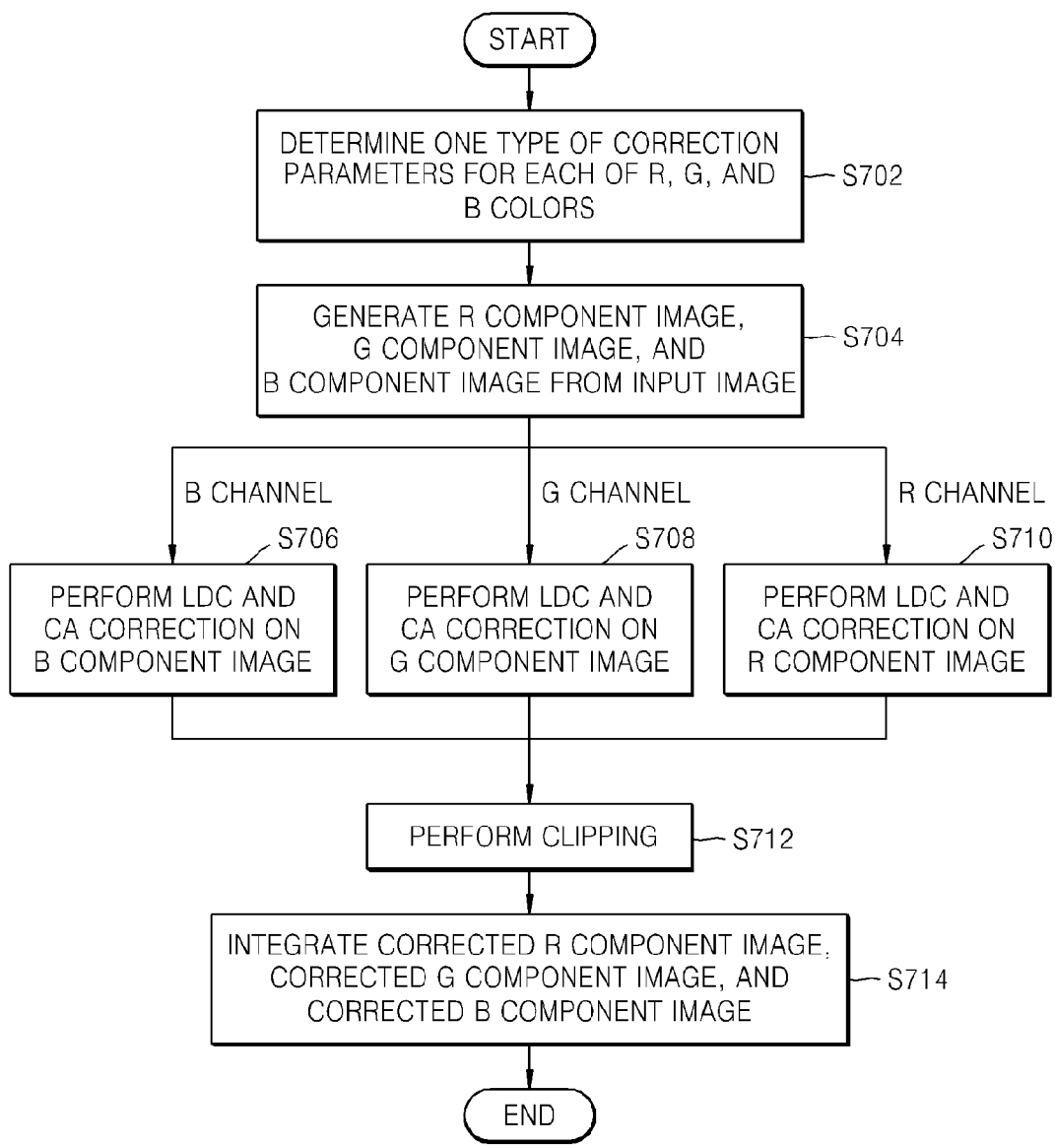
FIG. 7 illustrates an image processing method according to another embodiment of the invention.

FIG. 7 illustrates an image processing method according to another embodiment of the invention.

In the present embodiment, LDC and CA correction are not performed in different stages but in one stage. Since the LDC and the CA correction are performed to shift all pixels, if correction parameters in which both the LDC and the CA correction have been reflected are used, both the LDC and the CA correction may be performed in one shift operation for the pixels.

In the image processing method according to embodiments, in operation S702, instead of determining two types of correction parameters, namely, LDC parameters and CA correction parameters, for each of the R, G, and B, one type of correction parameters for each of the R, G, and B are determined. In other words, one type of correction parameters for R, one type of correction parameters for G, and one type of correction parameters for B are determined. Even in this case, the correction parameters for each of the R, G, and B may be determined according to types and zoom steps of lenses. The correction parameters may be pre-stored in the form of a look-up table.

FIG. 8 is a look-up table in which correction parameters are stored, according to another embodiment of the invention. As illustrated in FIG. 8, the correction parameters may be previously stored for each of the R, G, and B. The correction parameters for each of the R, G, and B may vary according to the types and zoom steps of lenses. Accordingly, the look-up table may include the correction parameters for each of the R, G, and B and also for the types and zoom steps of lenses. Each correction parameter may be pre-stored in the form of, for example, a matrix.

Referring back to FIG. 7, in operation S704, an R component image, a G component image, and a B component image are generated from an input image.

When the correction parameters for each of the R, G, and B are determined in S702 and the R component image, the G component image, and the B component image are generated from the input image in operation S704, LDC and CA correction with respect to each of the R component image, the G component image, and the B component image are performed in one stage. In other words, LDC and CA correction are performed on the B component image in operation S706, LDC and CA correction are performed on the G component image in operation S708, and LDC and CA correction are performed on the R component image in operation S710.

When the LDC and the CA correction are completed, clipping is performed to adjust the sizes of a corrected R component image, a corrected G component image, and a corrected B component image that correspond to results of the LDC and CA correction performed with respect to the R component image, the G component image, and the B component image, respectively, in operation S712. Thereafter, in operation S714, the corrected R component image, the corrected G component image, and the corrected B component image subjected to the clipping are integrated to output an RGB data format image.

Figure 9:
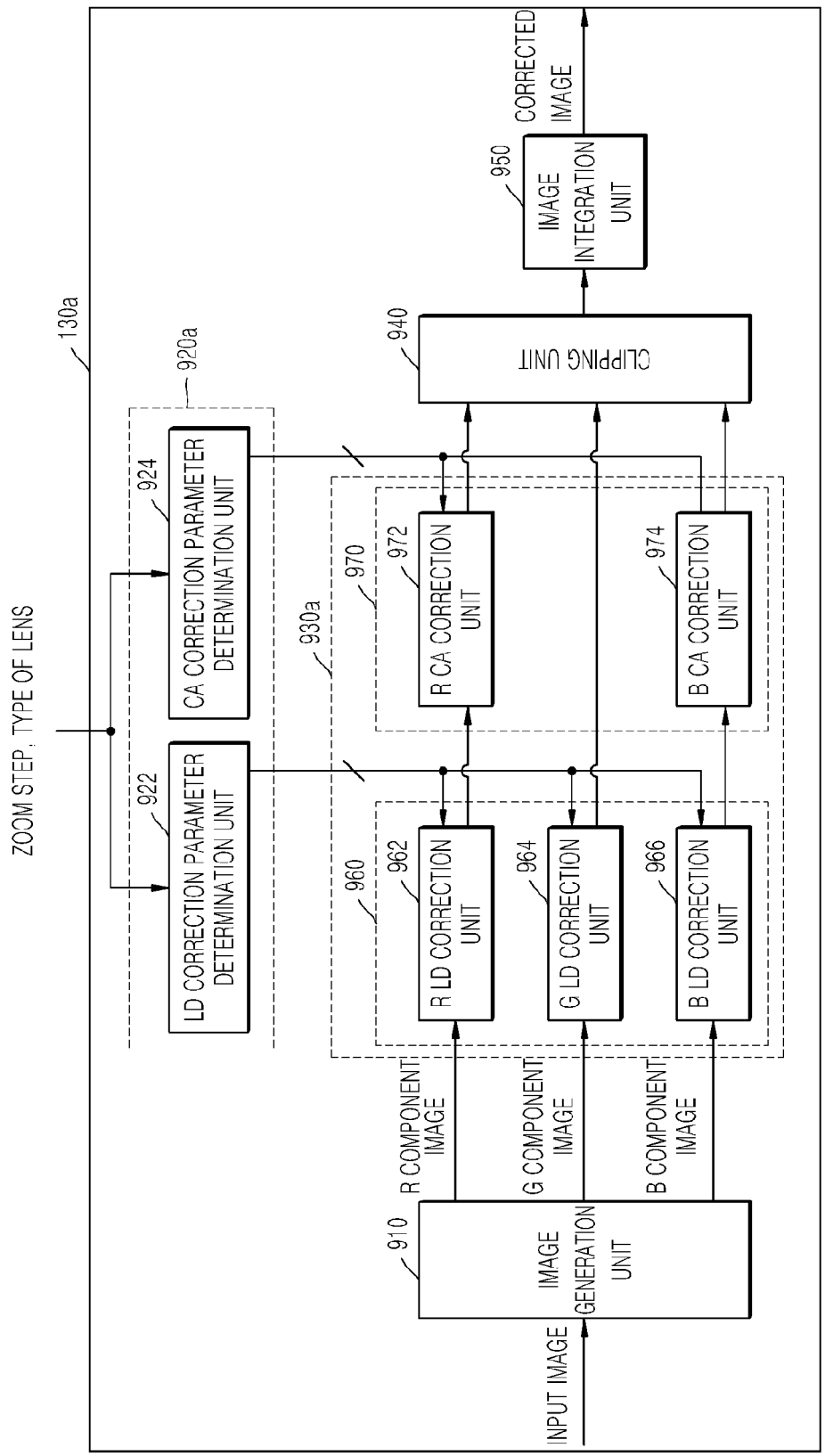
FIG. 9 is a block diagram of a structure of a digital signal processor (DSP) included in the image processing apparatus illustrated in FIG. 1, according to an embodiment of the invention.

FIG. 9 is a block diagram of a structure of a DSP 130a included in the image processing apparatus 100 illustrated in FIG. 1, according to an embodiment of the invention.

Referring to FIG. 9, the DSP 130a according to embodiments includes an image generation unit 910, a correction parameter determination unit 920a, a correction unit 930a, a clipping unit 940, and an image integration unit 950.

The image generation unit 910 generates an R component image, G component image, and a B component image from an input image. The input image may be a Bayer pattern image, or a data-format image including a plurality of color components, for example, a RGB data format image. The input image may be input from the imaging device 118 or the analog signal processing unit 120. The image generation unit 910 outputs the R component image, the G component image, and the B component image to the correction unit 930a.

The correction parameter determination unit 920a according to the present embodiment may include an LDC parameter determination unit 922 and a CA correction parameter determination unit 924. The LDC parameter determination unit 922 determines an LDC parameter for R, an LDC parameter for G, and an LDC parameter for B and outputs the same to an R LD correction unit 962, a G LD correction unit 964, and a B LD correction unit 966, respectively. The CA correction parameter determination unit 924 determines a CA correction parameter for R and a CA correction parameter for B and outputs the same to an R CA correction unit 972 and a B CA correction unit 974, respectively. The LDC parameters and the CA correction parameters may be previously stored in the form of a look-up table in the storage medium 152 or the memory 140. According to an embodiment of the invention, the LDC parameters and CA correction parameters for each of the R, G, and B? may be determined according to types and zoom steps of lenses. The LDC parameters and CA correction parameters for each of the R, G, and B may be determined according to types and zoom steps of lenses by using pre-stored information, for example, by using a look-up table. For example, the look-up table may be stored as illustrated in FIG. 6.

The correction unit 930a may include an LDC unit 960 and a CA correction unit 970. The LDC unit 960 may include the R LD correction unit 962, the G LD correction unit 964, and the B LD correction unit 966. The CA correction unit 970 may include the R CA correction unit 972 and the B CA correction unit 974.

The R component image output from the image generation unit 910 is input to the R LD correction unit 962. The R LD correction unit 962 performs LDC with respect to the R component image by using the LDC parameter for R and outputs an LD-corrected R component image corresponding to a result of the LDC to the R CA correction unit 972. At this time, the LD-corrected R component image is transmitted from the R LD correction unit 962 to the R CA correction unit 972 without passing through the memory 140. The R CA correction unit 972 performs CA correction with respect to the LD-corrected R component image output from the R LD correction unit 962 by using the CA correction parameter for R and outputs a CA-corrected R component image corresponding to a result of the CA correction to the clipping unit 940.

The G component image output from the image generation unit 910 is input to the G LD correction unit 964. The G LD correction unit 964 performs LDC with respect to the G component image by using the LDC parameter for G and outputs an LD-corrected G component image corresponding to a result of the LDC to the clipping unit 940. As described above, if the position of the imaging device 118 is determined according to a focal distance of a green-based optical signal, a G component image may be subjected to only LDC and may not be subjected to CA correction.

The B component image output from the image generation unit 910 is input to the B LD correction unit 966. The B LD correction unit 966 performs LDC with respect to the B component image by using the LDC parameter for B and outputs an LD-corrected B component image corresponding to a result of the LDC to the B CA correction unit 974. At this time, the LD-corrected B component image is transmitted from the B LD correction unit 966 to the B CA correction unit 974 without passing through the memory 140. The B CA correction unit 974 performs CA correction with respect to the LD-corrected B component image output from the B LD correction unit 966 by using the CA correction parameter for B and outputs a CA-corrected B component image corresponding to a result of the CA correction to the clipping unit 940.

The R LD correction unit 962, the G LD correction unit 964, and the B LD correction unit 966 may correct LD by using, for example, Equation 2 defined above.

The R CA correction unit 972 and the B CA correction unit 974 may correct CA by using, for example, Equation 3 defined above.

The clipping unit 940 performs clipping on a corrected R component image, a corrected G component image, and a corrected B component image that correspond to results of the LDC and CA correction performed with respect to the R component image, the G component image, and the B component image, respectively, in order to adjust the sizes of the corrected R component image, the corrected G component image, and the corrected B component image.

The image integration unit 950 integrates the corrected R component image, the corrected G component image, and the corrected B component image which have been subjected to the clipping, to output an RGB data format image.

Figure 10:
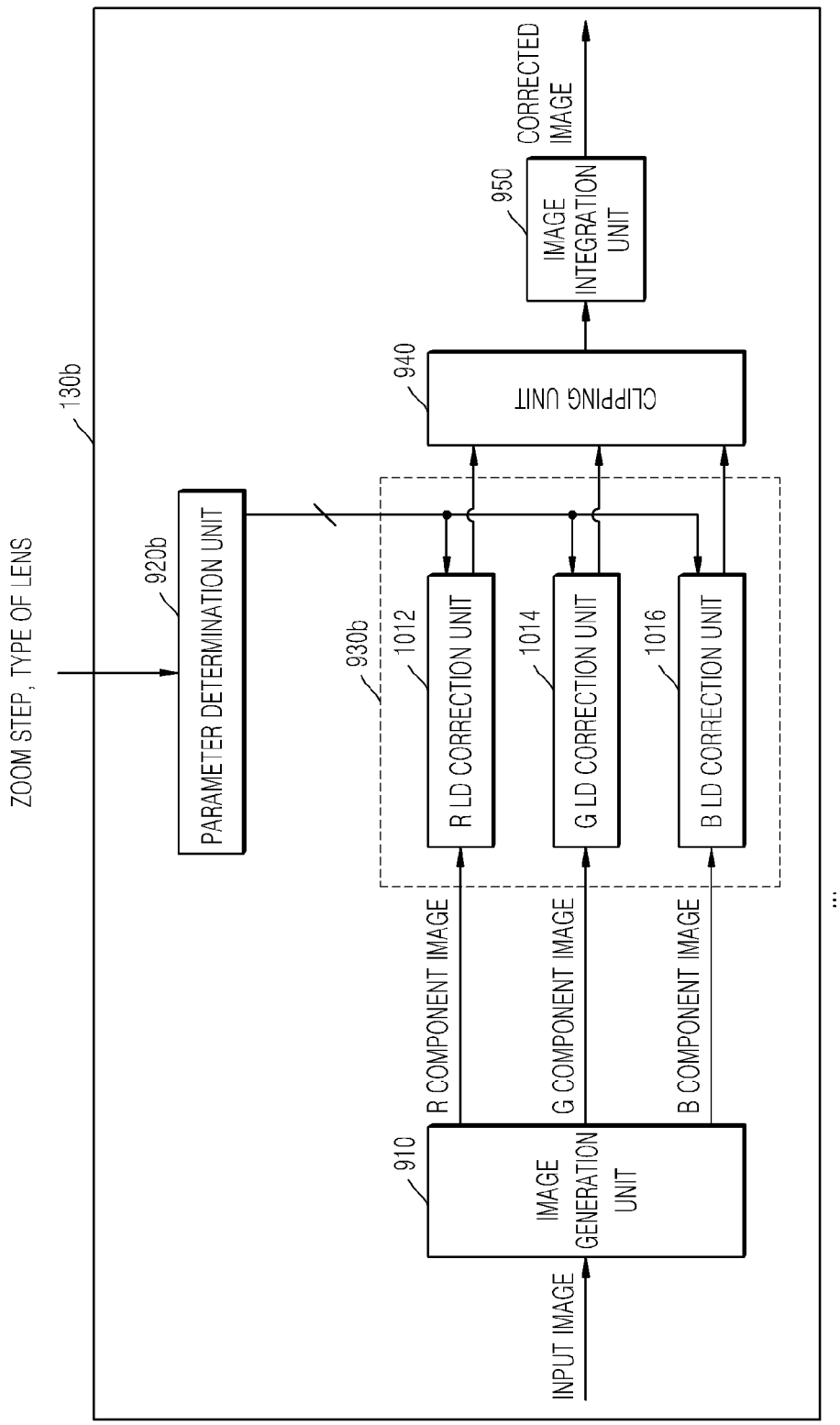
FIG. 10 is a block diagram of a structure of a DSP included in the image processing apparatus illustrated in FIG. 1, according to another embodiment of the invention.

FIG. 10 is a block diagram of a structure of a DSP 130b included in the image processing apparatus 100 illustrated in FIG. 1, according to another embodiment of the invention.

A correction parameter determination unit 920b according to the present embodiment determines one type of correction parameters for each of the R, G, and B instead of determining two types of correction parameters, namely, LDC parameters and CA correction parameters, for each of the R, G, and B. In other words, the correction parameter determination unit 920b determines one type of correction parameters for R, one type of correction parameters for G, and one type of correction parameters for B. Even in this case, the correction parameter determination unit 920b may determine the correction parameters for each of the R, G, and B according to types and zoom steps of lenses. The correction parameters may be pre-stored in the form of a look-up table in the storage medium 152 or the memory 140. For example, the correction parameters may be pre-stored as illustrated in FIG. 8.

A correction unit 930b according to embodiments may include an R image correction unit 1012, a G image correction unit 1014, and a B image correction unit 1016. The R image correction unit 1012 performs LDC and CA correction with respect to an R component image by using the correction parameter for R and outputs a result of the LDC and the CA correction to the clipping unit 940. The G image correction unit 1014 performs LDC and CA correction with respect to a G component image by using the correction parameter for G and outputs a result of the LDC and the CA correction to the clipping unit 940. The B image correction unit 1016 performs LDC and CA correction with respect to a B component image by using the correction parameter for B and outputs a result of the LDC and the CA correction to the clipping unit 940.

According to embodiments, LDC and CA correction are performed in a single module, and thus an image to be processed does not need to pass through a memory in a time duration between CA correction and LDC, thereby shortening an image processing time.

In addition, the LDC and the CA correction are independently performed according to color components of the image, and thus performances of the LDC and the CA correction improve, and lateral CA and longitudinal CA are both corrected.

Embodiments of the invention can also be computer readable codes on a computer readable recording medium. The computer readable recording medium is any type of data storage device that can store data which can be thereafter read by a computer system. The computer readable recording medium may be limited to physical medium.

The computer readable codes are constructed to perform the operations of an image processing method according to the invention, when the codes are read from the computer readable recording medium and executed by the DSP 130. The computer readable codes may be embodied in various programming languages. Also, functional programs, codes, and code segments for accomplishing the invention can be easily construed by programmers of ordinary skill in the art to which the invention pertains.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of processing an image with a data format comprising a plurality of color components, the method comprising:
generating a plurality of color component images for each of the plurality of color components;
correcting lens distortion (LD) and chromatic aberration (CA) for the plurality of color component images by calculating a corrected coordinate value for each of the plurality of color component images;
changing the sizes of corrected color component images on the basis of a corrected color component image having a minimum size from among the plurality of corrected color component images; and
generating a corrected image by integrating the corrected plurality of color component images.

2. The method of claim 1, wherein:
the data format is an RGB data format;
the plurality of color component images comprise an R component image, a G component image, and a B component image; and
the correcting of the LD and the CA comprises:
correcting LD and CA of the R component image;
correcting LD and CA of the G component image; and
correcting LD and CA of the B component image.

3. The method of claim 1, wherein:
the correcting of CA is based on a focal distance of one of the plurality of color components; and
the correcting of LD and CA is not performed on the one of the plurality of color components.

4. The method of claim 1, wherein the correcting of the LD and the CA comprises correcting the LD and the CA of each of the plurality of color component images by using different correction parameters.

5. The method of claim 1, wherein:
the image with the data format is captured by a photographing apparatus comprising a lens;
the method further comprises determining a plurality of correction parameters for each of the plurality of color components according to at least one of: a position of the lens when the input image is captured, and type of the lens; and
the correcting comprises correcting lens distortion (LD) and chromatic aberration (CA) for each of the plurality of color component images by using the plurality of correction parameters.

6. The method of claim 5, wherein:
the plurality of correction parameters for each of the plurality of color components comprise LD correction parameters and CA correction parameters;
the method further comprises:
determining the LD correction parameters for each of the plurality of color components according to at least one of: a type of the lens, and a position of the lens; and
determining the CA correction parameters for each of the plurality of color components according to at least one of: a type of the lens, and a position of the lens; and
the correcting of lens LD and CA comprises:
correcting LD of each of the plurality of color components by using the LD correction parameters for each of the plurality of color components; and
correcting CA of each of the plurality of color components by using the CA correction parameters for each of the plurality of color components.

7. An apparatus for processing an image with a data format comprising a plurality of color components, the apparatus comprising:
an image generation unit configured to generate a plurality of color component images corresponding to the plurality of color components;
a correction unit configured to correct lens distortion (LD) and chromatic aberration (CA) of each of the plurality of color component images by calculating a corrected coordinate value of each of the plurality of color component images;
a clipping unit configured to change the sizes of corrected color component images on the basis of a corrected color component image having a minimum size from among the plurality of corrected color component images; and
an image integration unit configured to integrate a plurality of corrected color component images corresponding to a result of the LD and CA corrections and size-equalized in the clipping unit to generate a corrected image.

8. The apparatus of claim 7, wherein:
the data format is an RGB data format;
the plurality of color component images comprise an R component image, a G component image, and a B component image; and
the correction unit comprises:
an R correction unit configured to correct LD and CA of the R component image;
a G correction unit configured to correct LD and CA of the G component image; and
a B correction unit configured to correct LD and CA of the B component image.

9. The apparatus of claim 7, wherein:
the correction unit configured is configured to perform CA correction based on a focal distance of one of the plurality of color components; and
the correction unit is configured to not perform substantial CA correction on the one of the plurality of color components.

10. The apparatus of claim 7, wherein the correction unit is configured to correct the LD and the CA of each of the plurality of color component images by using different correction parameters.

11. The apparatus of claim 7, further comprising:
a lens configured to capture the image with the data format;
a correction parameter determination unit configured to determine a plurality of correction parameters for each of the plurality of color components according to at least one of: a position of the lens when the input image is captured, and a type of the lens; and
wherein the correction unit is configured to correct the LD and the CA of each of the plurality of color component images by using the plurality of correction parameters.

12. The apparatus of claim 11, wherein:
the plurality of correction parameters for each of the plurality of color components comprise LD correction parameters and CA correction parameters;
the correction parameter determination unit further comprises:
an LD correction parameter determination unit configured to determine the LD correction parameters for each of the plurality of color components according to the types of the lens and/or the positions of the lens; and a CA correction parameter determination unit configured to determine the CA correction parameters for each of the plurality of color components according to at least one of: a type of the lens, and a position of the lens; and the correction unit comprises:

an LD correction unit configured to correct LD of each of the plurality of color components by using the LD correction parameters for each of the plurality of color components; and a CA correction unit configured to correct CA of each of the plurality of color components by using the CA correction parameters for each of the plurality of color components.

13. A non-transitory computer readable recording medium having recorded thereon a computer program for processing an image with a data format comprising a plurality of color components, the computer readable recording medium comprising:

a code portion to generate a plurality of color component images corresponding to the plurality of color components;

a code portion to correct lens distortion (LD) and chromatic aberration (CA) of each of the plurality of color component images by calculating a corrected coordinate value of each of the plurality of color component images;

a code portion to change the sizes of corrected color component images on the basis of a corrected color component image having a minimum size from among the plurality of corrected color component images; and a code portion to generate a corrected image by integrating a plurality of corrected color component images corresponding to a result of the LD and CA corrections.

14. The computer readable recording medium of claim 13, wherein:

the data format is an RGB data format;

the plurality of color component images comprise an R component image, a G component image, and a B component image; and the code portion to correct the LD and the CA comprises:

a code portion to correct LD and CA of the R component image;

a code portion to correct LD and CA of the G component image; and a code portion to correct LD and CA of the B component image.

15. The computer readable recording medium of claim 13, wherein:

the code portion to correct LA and CA comprises a code portion to correct lens distortion (LD) and chromatic aberration (CA) of each of the plurality of color component images based on a focal distance of one of the plurality of color components; and the CA correction is not performed on the one of the plurality of color components.

16. The computer readable recording medium of claim 13, wherein the code portion to correct the LD and the CA is configured to correct the LD and the CA of each of the plurality of color component images by using different correction parameters.

17. The computer readable recording medium of claim 13, wherein:

the image of the data format is captured by a photographing apparatus comprising a lens;

the computer readable recording medium further comprises a code portion to determine a plurality of correction parameters for each of the plurality of color components according to at least one of: a position of the lens, and a type of the lens; and the code portion to correct the LD and the CA is configured to correct the LD and the CA of each of the plurality of color component images by using the plurality of correction parameters.

18. The computer readable recording medium of claim 17, wherein:

the plurality of correction parameters for each of the plurality of color components comprise LD correction parameters and CA correction parameters;

the computer readable recording medium further comprises:

a code portion to determine the LD correction parameters for each of the plurality of color components according to at least one of: a type of the lens, and a position of the lens; and a code portion to determine the CA correction parameters for each of the plurality of color components according to at least one of: a type of the lens, and a position of the lens; and the code portion for correcting the LD and the CA comprises:

a code portion to correct LD of each of the plurality of color components by using the LD correction parameters for each of the plurality of color components; and a code portion to correct CA of each of the plurality of color components by using the CA correction parameters for each of the plurality of color components.

19. A method of processing an image with a data format comprising a plurality of color components, the method comprising:

generating a plurality of color component images for each of the plurality of color components;

correcting lens distortion (LD) and chromatic aberration (CA) for the plurality of color component images by calculating a corrected coordinate value of each of the plurality of color component images;

changing the sizes of corrected color component images by clipping invalid pixels on the basis of a corrected color component image having a minimum size from among the plurality of corrected color component images; and generating a corrected image by integrating the corrected plurality of color component images.

* * * * *